United States Patent
Hwang et al.

(10) Patent No.: US 7,499,385 B2
(45) Date of Patent: Mar. 3, 2009

(54) WRITE-ONCE RECORDING MEDIUM PRESERVING DATA-RECORDING STATUS, METHOD OF PRESERVING DATA-RECORDING STATUS OF A WRITE-ONCE RECORDING MEDIUM, MEDIUM INCLUDING COMPUTER READABLE CODE FOR THE SAME, AND RECORDING AND/OR REPRODUCING APPARATUS THEREFOR

(75) Inventors: Sung-hee Hwang, Seoul (KR); Jung-wan Ko, Gyeonggi-do (KR); Kyung-geun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/856,392

(22) Filed: Sep. 17, 2007

(65) Prior Publication Data

US 2008/0008071 A1 Jan. 10, 2008

Related U.S. Application Data

(63) Continuation of application No. 11/220,609, filed on Sep. 8, 2005, now Pat. No. 7,376,060, which is a continuation of application No. 10/792,919, filed on Mar. 5, 2004, now Pat. No. 7,397,738.

(60) Provisional application No. 60/472,114, filed on May 21, 2003, provisional application No. 60/456,940, filed on Mar. 25, 2003.

(30) Foreign Application Priority Data

| Mar. 8, 2003 | (KR) | ................................. 2003-14612 |
| Mar. 17, 2003 | (KR) | ................................. 2003-16499 |
| Apr. 15, 2003 | (KR) | ................................. 2003-23729 |
| Jul. 28, 2003 | (KR) | ................................. 2003-52080 |

(51) Int. Cl.
*G11B 11/00* (2006.01)
(52) U.S. Cl. .................................. 369/53.15; 369/275.3
(58) Field of Classification Search ....................... None
See application file for complete search history.

(56) References Cited

U.S. PATENT DOCUMENTS 6,243,338 B1 6/2001 Mine (Continued)

FOREIGN PATENT DOCUMENTS

EP 0 350 920 1/1990

(Continued)

OTHER PUBLICATIONS

U.S. Appl. No. 10/792,919, filed Mar. 3, 2004, Sung-hee Hwang et al.

(Continued)

*Primary Examiner*—Paul Huber
(74) *Attorney, Agent, or Firm*—Stein, McEwen & Bui, LLP

(57) ABSTRACT

A write-once recording medium preserving a data recording status of the write-once recording medium, a method of preserving the data recording status of a write-once recording medium, a medium including computer readable code for the same, and a recording and/or reproducing apparatus therefor. In the method of preserving the data recording status of a write-once recording medium, first, data is recorded on the write-once recording medium. Next, recording-status data, representing occupied areas, is produced and recorded in a temporary defect management area allocated in the write-once recording medium. Thereafter, a finalization command is received to preserve the data-recording status of the recording medium. Then, in response to the finalization command, predetermined data is recorded in a temporary defect management area to prevent further data recording on the write-once recording medium. Accordingly, the data recording status of the finalized write-once recording medium can be preserved.

6 Claims, 10 Drawing Sheets

U.S. PATENT DOCUMENTS

| | | |
|---|---|---|
| 6,667,939 B1 | 12/2003 | Miyamoto |
| 6,850,474 B2 | 2/2005 | Araki et al. |
| 6,970,407 B2 | 11/2005 | Ko et al. |
| 7,397,738 B2 | 7/2008 | Hwang et al. |

FOREIGN PATENT DOCUMENTS

| | | |
|---|---|---|
| EP | 0 908 882 | 4/1999 |
| JP | 2000-293971 | 10/2000 |
| JP | 2001-283463 | 10/2001 |
| JP | 2003-54135 | 2/2003 |
| WO | WO 2004/029941 | 4/2004 |
| WO | WO 2004/059648 | 7/2004 |

OTHER PUBLICATIONS

U.S. Appl. No. 11/220,609, filed Sep. 8, 2005, Sung-hee Hwang et al.
U.S. Appl. No. 11/429,102, filed May 8, 2006, Sung-hee Hwang et al.
U.S. Appl. No. 11/429,315, filed May 8, 2006, Sung-hee Hwang et al.
U.S. Appl. No. 11/839,984, filed Aug. 16, 2007, Sung-hee Hwang et al.
U.S. Appl. No. 11/840,742, filed Aug. 17, 2007, Sung-hee Hwang et al.
U.S. Appl. No. 11/840,785, filed Aug. 17, 2007, Sung-hee Hwang et al.
Search Report dated Jul. 28, 2008 of the Malaysian Patent Application No. PI20040729.
Search Report dated Aug. 8, 2008 of the European Patent Application No. 04717313.3.

FIG. 1A
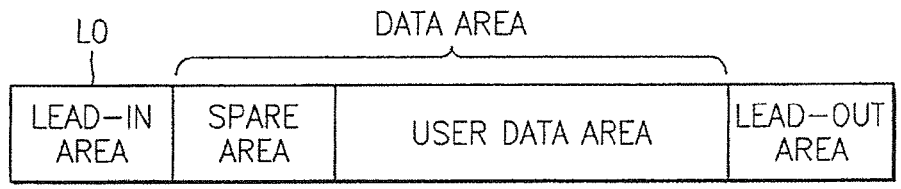
FIG. 1B
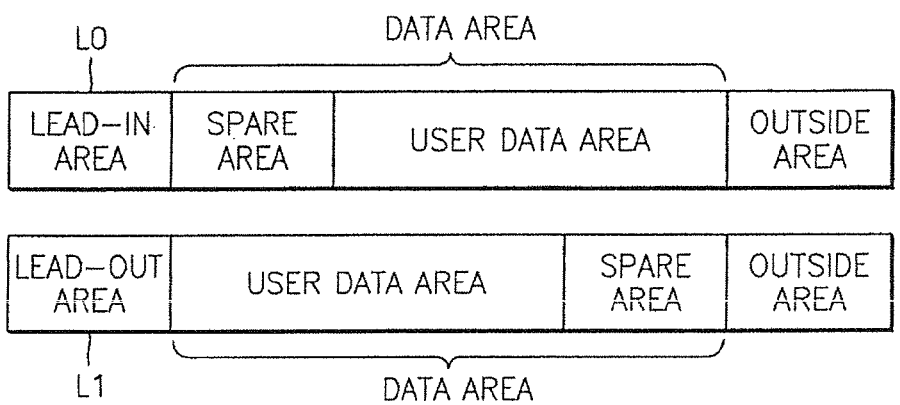
FIG. 2
| | |
|---|---|
| SBM #0 | finalization flag = 0 |
| | update counter = 0 |
| | Bit Map #0 |
| SBM #1 | finalization flag = 0 |
| | update counter = 1 |
| | Bit Map #1 |
| ... | ... |
| SBM #n | finalization flag = 0 |
| | update counter = n |
| | Bit Map #n |
| ... | ... |

FIG. 3

| | |
|---|---|
| SBM #0 | finalization flag = 0 |
| | update counter = 0 |
| | Bit Map #0 |
| SBM #1 | finalization flag = 0 |
| | update counter = 1 |
| | Bit Map #1 |
| ... | ... |
| SBM #n | finalization flag = 0 |
| | update counter = n |
| | Bit Map #n |
| SBM #n | finalization flag = 1 |
| | update counter = n |
| | Bit Map #n |
| RECORDING PREVENTION AREA | ffh |
| ... | ... |

FIG. 6

| | |
|---|---|
| | ... |
| | DEFECT MANAGEMENT AREA (DMA2) |
| | RECORDING CONDITION TEST AREA |
| LEAD-IN AREA | AREA FOR BOTH TDDS AND SBM (TDDS+SBM AREA) |
| | TDFL AREA |
| | DISC AND DRIVE INFORMATION AREA |
| | DEFECT MANAGEMENT AREA (DMA1) |
| | ... |
| | SPARE AREA 1 |
| DATA AREA | USER DATA AREA |
| | SPARE AREA 2 |
| | ... |
| LEAD-OUT AREA | DEFECT MANAGEMENT AREA (DMA4) |
| | ... |
| | DEFECT MANAGEMENT AREA (DMA3) |
| | ... |

FIG. 8

| Lead-in | ... |
| --- | --- |
| | DMA2 |
| | Recording Condition Test Area |
| | TDMA |
| | Drive information Area |
| | DMA1 |
| | ... |
| Data Area | Spare Area 1 |
| | update counter = n |
| | Spare Area 2 |
| Lead-out | ... |
| | DMA3 |
| | ... |
| | DMA4 |
| | ... |

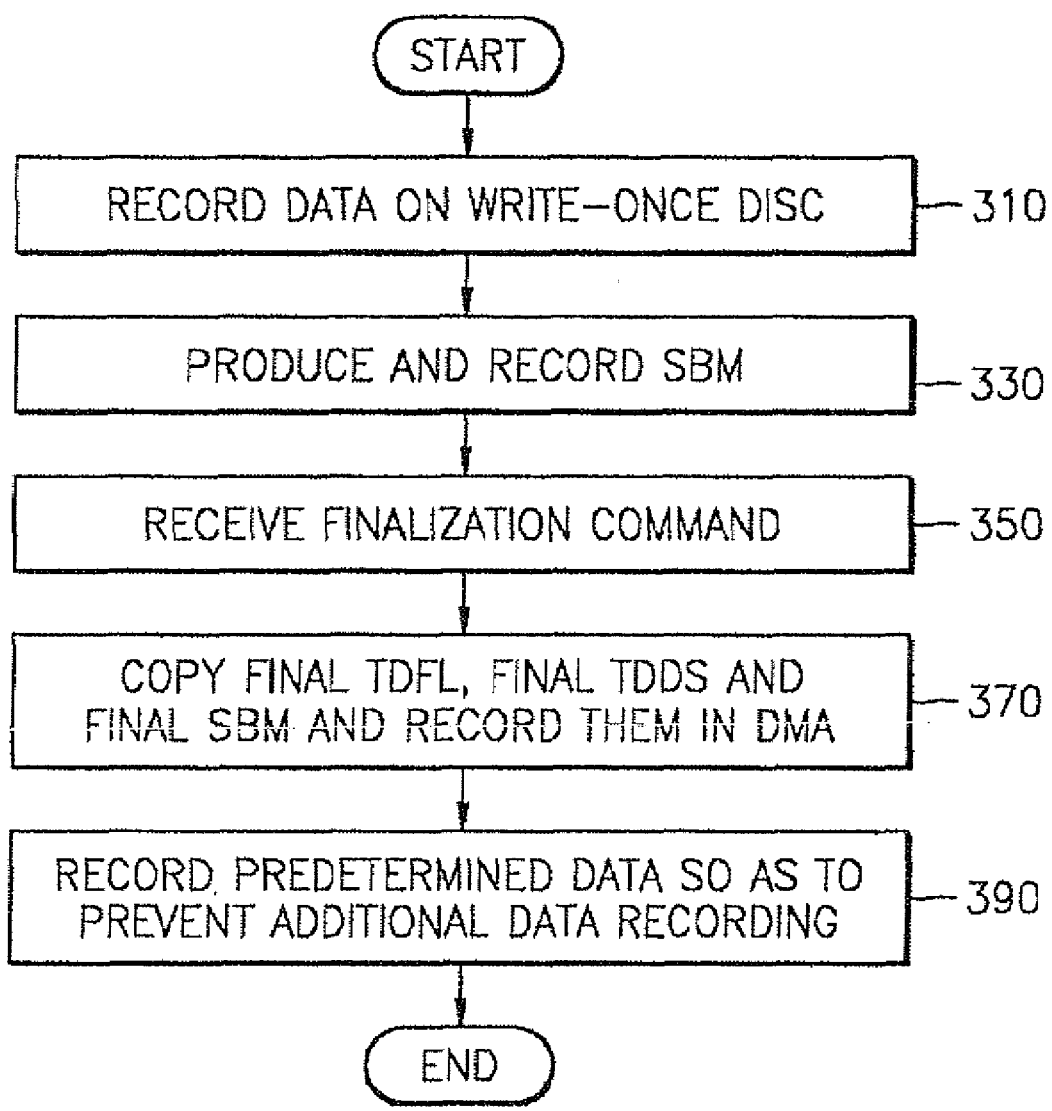

WRITE-ONCE RECORDING MEDIUM PRESERVING DATA-RECORDING STATUS, METHOD OF PRESERVING DATA-RECORDING STATUS OF A WRITE-ONCE RECORDING MEDIUM, MEDIUM INCLUDING COMPUTER READABLE CODE FOR THE SAME, AND RECORDING AND/OR REPRODUCING APPARATUS THEREFOR

CROSS-REFERENCE TO RELATED APPLICATIONS

This application is a continuation of Ser. No. 11/220,609, filed Sep. 8, 2005, now U.S. Pat. No. 7,376,060, which is a continuation of Ser. No. 10/792,919, filed Mar. 5, 2004, now U.S. Pat. No. 7,397,738, and claims the priority benefit of Korean Patent Application Nos. 2003-14612, 2003-16499, 2003-23729 and 2003-52080 filed on Mar. 8, Mar. 17, Apr. 15, and Jul. 28, 2003, respectively, in the Korean Intellectual Property Office, and the priority benefit of U.S. Provisional Application Nos. 60/456,940 and 60/472,114, filed on Mar. 25 and May 21, 2003, respectively, in the United States Patent and Trademark Office, the disclosures of which are incorporated herein in their entirety by reference.

BACKGROUND OF THE INVENTION

1. Field of the Invention

The present invention relates to a write-once recording medium preserving a data-recording status of the write once-recording medium, a method of preserving the data-recording status of a write-once recording medium, a medium including computer readable code for the same, and a recording and/or reproducing apparatus for the write-once recording medium.

2. Description of the Related Art

A data-recordable area of a recording medium, e.g., an optical disc, is made up of a lead-in area, a lead-out area, and a data area, each of which is made up of clusters. A cluster is a unit in which data is recorded or reproduced. Depending on the type of data and the type of standardized recording method, data clusters are recorded in one of the three areas.

After data recording, bit maps are created to represent information about all areas where data has been recorded, and the bit maps are then recorded in a predetermined area of the recording medium, contributing to convenient data recording and/or reproducing. To be more specific, bit maps are created to represent occupied clusters and unoccupied clusters of each of the lead-in area, the lead-out area, and the data area. The bit maps are recorded on the recording medium so that a recording and/or reproducing apparatus can perform rapid access to a desired area of the recording medium. In particular, since bit maps identify occupied areas of data, they are very useful for write-once recording media, in which management of defects generated during data recording is important.

A finalized write-once recording medium denotes a write-once recording medium in a state where no more data can be recorded to the recording medium. Finalization of a write-once recording medium can be either where a write-once recording medium is finalized even though additional data can be recorded in a user data area of the write-once recording medium, or where a write-once recording medium is finalized when it reaches a predetermined finalization condition, for example, when no more data can be recorded on the write-once recording medium because its user data area is fully occupied with data.

When a write-once recording medium is finalized, the current data recording status of the recording medium needs to be preserved, or changes of the data recording status need to be prevented. Generally, when back-up data or an image photographed by a monitoring camera is recorded on a write-once recording medium, great measures must be taken to prevent a third party from forging or changing the recorded data of the recording medium. Even if the recorded data is changed by a third person, the change in the recorded data needs to be identified, and the original data recorded on the write-once recording medium needs to be ascertained.

SUMMARY OF THE INVENTION

The present invention provides a write-once recording medium preserving a data recording status of the write-once recording medium, a method of preserving the data recording status of a write-once recording medium, a medium including computer readable code for the same, and a recording and/or reproducing apparatus therefor, by which the data-recording status of a finalized write-once recording medium is preserved or modifications of the data recording status of the finalized recording medium are prevented, a change in the data recording status of the finalized recording medium is easily ascertained, and the original data recorded in the write-once recording medium, corresponding to the previous recording status, is ascertained.

Additional aspects and/or advantages of the invention will be set forth in part in the description which follows and, in part, will be obvious from the description, or may be learned by practice of the invention.

To achieve the above and/or other aspects and advantages, embodiments of the present invention provide a method of preserving a data recording status of a recording medium, including recording data on the recording medium, producing recording-status data, representing occupied areas of the recording medium, and recording the recording-status data in a temporary defect management area allocated in the recording medium, receiving a finalization command to preserve a data-recording status data of the recording medium, and recording predetermined data in the temporary defect management area, in response to the finalization command, to prevent further data recording on the recording medium.

The recording of the predetermined data further may further include copying temporary management data, including the recording-status data finally recorded in the temporary defect management area and recording the copied temporary management data in a defect management area on the recording medium in response to the finalization command.

The method may further include preventing further data recording by determining whether the recording medium has been finalized based on the defect management area containing the copied temporary management data, and preventing further data recording by determining whether the recording medium has been finalized based on the defect management area containing the copied temporary management data. In addition, the predetermined data may be recorded in an entire unoccupied area of the temporary defect management area.

Further, the recording-status data may include bit maps, distinguishing occupied data areas of the recording medium from unoccupied data areas of the recording medium, of an entire data-recordable area on the recording medium by representing the occupied and/or unoccupied areas with different values in the bit maps. Each of the bit maps may indicate whether data has been recorded in individual clusters of the recording medium, with each cluster being a data recording unit of the recording medium. The recording medium may also be a write-once recording medium.

To achieve the above and/or other aspects and advantages, embodiments of the present invention provide a method of recording data on a recording medium, including determining whether the recording medium has been finalized based on a detected finalization flag recorded in a spare bit map of the recording medium, and preventing a recording of data to the recording medium based on a determination that the recording medium has been finalized.

To further achieve the above and/or other aspects and advantages, embodiments of the present invention provide a method of recording data on a recording medium, including preventing a recording of data to the recording medium based on a determination that predetermined data is recorded in a temporary defect management area, previously recorded to the recording medium in response to a finalization command, to prevent further recording of data to the recording medium.

Still further, to achieve the above and/or other aspects and advantages, embodiments of the present invention provide a method of recording data on a recording medium, including determining whether the recording medium has been finalized based on a detected finalization flag recorded in a defect management area (DMA) of the recording medium, and preventing a recording of data to the recording medium based on a determination that the recording medium has been finalized.

To achieve the above and/or other aspects and advantages, embodiments of the present invention provide a method of recording data on a recording medium, including preventing a recording of data to the recording medium based on a recorded temporary disc defect structure (TDDS), temporary disc defect list (TDFL), or space bit map (SBM) recorded in a defect management area (DMA), indicating that the recording medium has been finalized, with the DMA not including a finalization flag. The TDDS, TDFL, and SBM may also be recorded in a temporary defect management area (TDMA), separate from the DMA. The TDDS and SBM may further be stored in a single area separate from an area including the TDFL.

To achieve the above and/or other aspects and advantages, embodiments of the present invention provide a recording and/or reproducing apparatus including a pickup writing data to or reading data from a recording medium, and a controller controlling the pickup to record data on the recording medium, to produce and control the pickup to record recording-status data, the recording-status data representing occupied areas among the entire data-recordable area on the recording medium, in a temporary defect management area allocated on the recording medium, and to record predetermined data in the temporary defect management area in response to a finalization command, issued to preserve a data-recording status of the recording medium, preventing further data recording on the recording medium.

To achieve the above and/or other aspects and advantages, embodiments of the present invention provide a recording and/or reproducing apparatus, including a pickup writing data to or reading data from a recording medium, and a controller controlling the pickup to record data on the recording medium and to prevent the recording of data to the recording medium based on a determination that a temporary defect management area of the recording medium contains a predetermined data identifying that the recording medium has been finalized. The determination that the predetermined data is recorded in the temporary defect management area may be based on predesignated data being recorded in an entire unoccupied area of the temporary defect management area.

To achieve the above and/or other aspects and advantages, embodiments of the present invention provide a recording medium having a lead-in area, a data area, and a lead-out area, including a temporary defect management area formed in at least one of the lead-in area, the data area, and the lead-out area, wherein recording-status data, which identifies occupied areas of the recording medium, is recorded in the temporary defect management area, wherein predetermined data is recorded in the temporary defect management area, if the recording medium has been finalized, to prevent further data recording on the recording medium.

To achieve the above and/or other aspects and advantages, embodiments of the present invention provide a medium including computer readable code controlling a controller of a recording and/or reproducing apparatus to perform method embodiments of the present invention.

Similarly, to achieve the above and/or other aspects and advantages, embodiments of the present invention provide a medium including computer readable code controlling the controller of the recording and/or reproducing apparatus embodiments of the present invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 1A and 1B illustrate structures of a write-once recording medium, according to embodiments of the present invention;

FIG. 2 illustrates a structure of recording-status data, according to an embodiment of the present invention;

FIG. 3 illustrates a structure of final recording-status data, according to an embodiment of the present invention;

FIG. 6 illustrates another detailed data structure of a write-once recording medium having a single recording layer, according to an embodiment of the present invention;

FIG. 8 illustrates another detailed data structure of a write-once recording medium having a single recording layer, according to an embodiment of the present invention;

FIG. 12 is a flowchart illustrating a method of preserving the data-recording status of a write-once recording medium, according to another embodiment of the present invention.

DETAILED DESCRIPTION OF THE PREFERRED EMBODIMENTS

Figure 4:
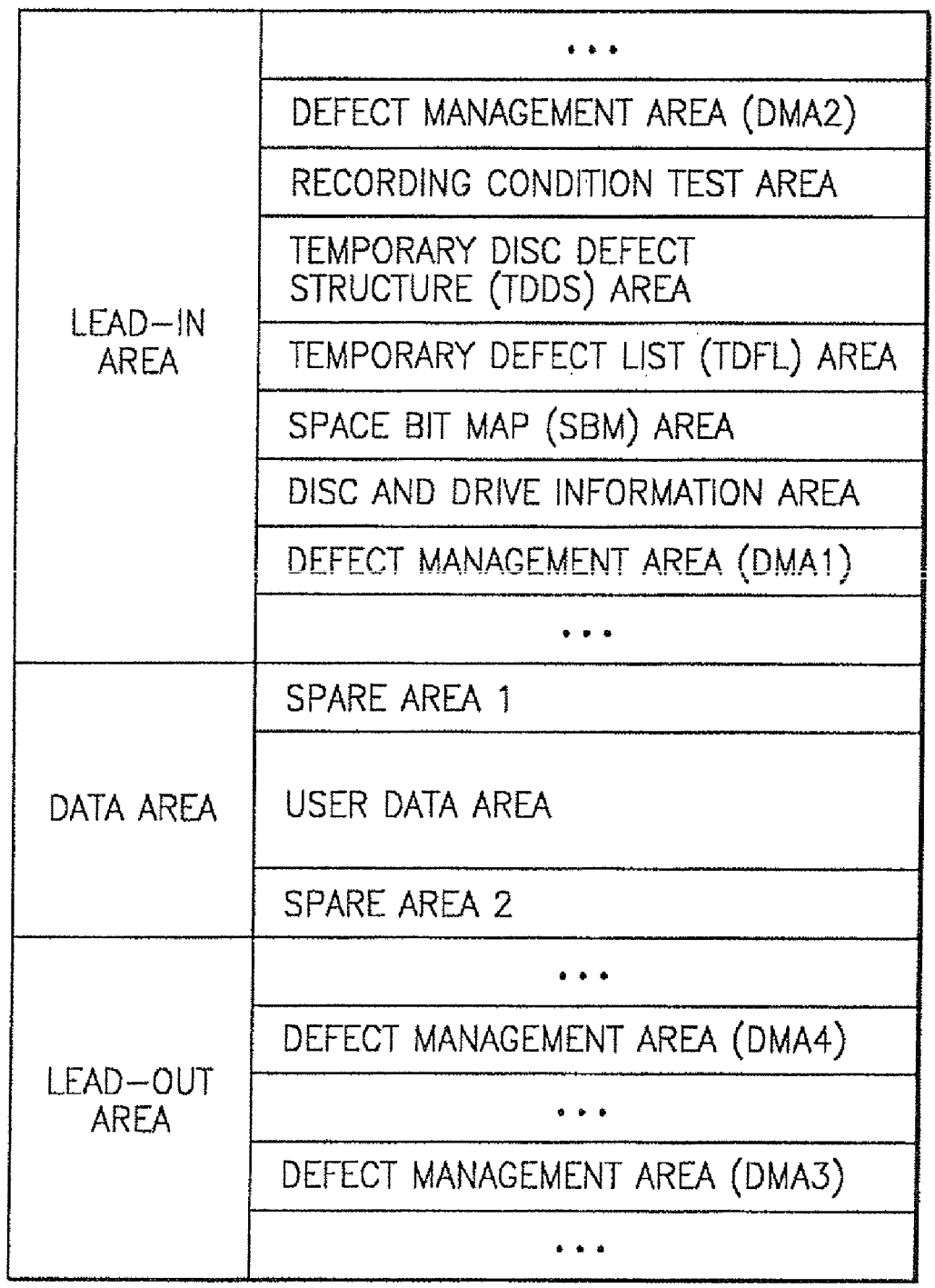
FIG. 4 illustrates a detailed data structure of a write-once recording medium having a single recording layer, according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 illustrates a structure of a write-once recording medium according to an embodiment of the present invention. As illustrated in FIG. 1A, if a write-once recording medium has a single recording layer L0, it includes a lead-in area, a data area, and a lead-out area. The lead-in area is located near the inner boundary of the write-once recording medium, and the lead-out area is located near the outer boundary of the write-once recording medium. The data area is formed between the lead-in and lead-out areas and is divided into a spare area and a user data area.

A user data area denotes the area where user data is recorded. A spare area denotes the area used to replace recordable space in the user data area lost to defects. Since it is typically preferable that the write-once recording medium provides a maximum capacity for recording data, while still allowing for defects, the spare area may initially be set at about 5% of the entire data capacity of the recording medium.

As illustrated in FIG. 1B, if a write-once recording medium has two recording layers L0 and L1, the recording layer L0 has a lead-in area, a data area, and an outside area, sequentially formed from the inner boundary to the outer boundary of the recording medium. The recording layer L1 has an outside area, a data area, and a lead-out area, which are also sequentially formed from the outer boundary to the inner boundary of the recording medium. In contrast with the single-recording layer write-once recording medium of FIG. 1A, the lead-out area in the double sided recording medium is formed near the inner boundary of the recording medium.

In other words, the double recording layer write-once recording medium of FIG. 1B records data in an opposite track path (OTP) starting from the lead-in area of the recording layer L0 to the outside area thereof and then from the outside area of the recording layer L1 to the lead-out area thereof, with a spare area being allocated in each of the recording layers L0 and L1.

In the embodiment of FIGS. 1A and 1B, the spare areas can exist between the lead-in area and the user data area and between an outside area and the user data area. However, in some cases, a spare area may also be formed in extra spaces obtained by dividing the user data area, such that at least one spare area may exist between the lead-in area and the lead-out area. Thus, there may be multiple spare areas with various, potentially dynamic, locations.

"Recording-status" data denotes information that represents the recording status of the entire data-recordable area on a recording medium by distinguishing occupied areas from unoccupied areas. Particularly, information produced by allocating different bit values to occupied and unoccupied clusters is referred to as a bit map, with a cluster being the unit in which data is recorded, and the cluster also being called a block.

FIG. 2 illustrates the structure of a recording-status data according to an embodiment of the present invention. As illustrated in FIG. 2, a space bit map (SBM) of SBM #0 through SBM #n represents the recording-status data.

An SBM #i (i being an integer between 0 and n) includes an identifier of each SBM (e.g., SBM #i), head data, and bit map data (e.g., Bit Map #i). The head data includes a finalization flag and an update counter and the bit map data indicates whether data has been recorded in cluster units on the recordable area of the write-once recording medium.

If the recording-status data changes due to the recording of additional data in the recording medium, an SBM #i must be produced and recorded, which includes new bit map data representing the occupied data area. When the new SBM #i is produced and recorded, an update counter included in the new SBM #i indicates the number of updates there have been to the recording-status data.

The time at which each SBM #i is produced to update the recording-status data may vary according to a program installed in a recording and/or reproducing apparatus. However, typically, before a write-once recording medium, on which data has been recorded, is ejected from a recording and/or reproducing apparatus, a new SBM #i will be produced and recorded at least once.

A finalization flag is also used to indicate whether the write-once recording medium has been finalized.

FIG. 3 illustrates a structure of final recording-status data according to an embodiment of the present invention. Before a write-once recording medium is finalized, finalization flags included in a head area of each SBM are represented as "0" and recorded together with other data. As illustrated in FIG. 3, an SBM recorded before finalization of the occupied area is represented by SBM #n. If a host, like a computer host, issues a finalization command to a recording and/or reproducing apparatus, only the finalization flag value, among the data of finally-updated SBM #is changed from "0" to "1" and the SBM #n including the finalization flag "1" is re-recorded to indicate that the recording medium has been finalized.

As illustrated in FIG. 3, in some cases, predetermined data such as "ffh" is recorded in the area next to the SBM #n with the finalization flag "1", thereby preventing further SBM recording and additional data recording on the write-once recording medium. In this case, it is preferable that "ffh" is recorded on the entire unoccupied portion of the area for recording an SBM.

Due to recording of the SBM with the finalization flag "1", users are able to preserve the data-recording status of the write-once recording medium at the time of finalization. In other words, even when data recorded on the finalized recording medium changes, or new data is added to the recorded data, the data recorded before finalization can be identified by referring to the bit map data included in the SBM with the finalization flag "1". This permits the identification of additional data recorded after finalization.

Due to the recording of predetermined data in the area next to the SBM #n with the finalization flag "1" after finalization, no more SBM can be recorded, to prevent additional data recording on the finalized write-once recording medium.

Although the finalization flag, in the embodiments of FIGS. 2 and 3, is recorded in the head area of each SBM #i, the location of the finalization flag is not limited in the present invention. The finalization flag may be recorded in an area other than the head area of each SBM #i.

Hereinafter, an area for recording a finalization flag will be described in detail with reference to the accompanying drawings. FIG. 4 shows an embodiment of a detailed data structure of a write-once recording medium having a single recording layer according to an embodiment of the present invention. Referring to FIG. 4, a lead-in area includes a temporary disc defect structure (TDDS) area, a temporary defect list (TDFL) area, and an SBM area.

Typically, a defect management area (DMA), which stores information about defects generated while recording data in a data area, is formed in a lead-in area and/or a lead-out area. When a recording medium is loaded on a recording and/or reproducing apparatus, the recording and/or reproducing apparatus performs initialization. The initialization operation includes ascertaining how to manage the write-once recording medium and how to record or reproduce data on the recording medium by reading out data from a lead-in area and/or a lead-out area, including defect data.

Hence, as the amount of data recorded in the lead-in area and/or the lead-out area increases, the time required for initialization, after recording medium loading, increases. To reduce the time required for initialization, temporary management data, which includes a TDDS and a TDFL, is used, with the TDFL and TDDS being recorded in a temporary defect management area (TDMA), separate from the DMAs of the lead-in area and/or the lead-out area.

A TDFL includes data identifying defective areas and data identifying recently replaced areas. A TDDS is used to manage the TDFL and includes data identifying the recording location of the TDFL.

The temporary management data also includes an SBM, which represents the recording-status data.

In other words, a TDMA is provided to store a TDDS, a TDFL, and an SBM. The TDMA is formed in at least one of a lead-in area, a data area, and a lead-out area, and can be physically one area or divided into a plurality of areas.

For example, referring to FIG. 4, a lead-in area includes a TDDS area, a TDFL area, and an SBM area. In this case, the TDMA is divided into a TDDS area, a TDFL area, and an SBM area. As illustrated in FIG. 6, the lead-in area can include an area for storing both a TDDS and an SBM (i.e., a TDDS+SBM area) and an area for storing a TDFL. In this case, a TDMA is divided into two areas.

When the write-once recording medium is finalized, because no more data is required to be recorded on the recording medium or because no more data can be recorded thereon, recently recorded TDFLs and TDDSs are moved to and finally recorded in the DMA(s). Accordingly, when a recording and/or reproducing apparatus reads defect management data from the write-once recording medium later, only significant data will be read from the DMA. Thus, faster initialization can be achieved. Also, because identical defect management data may be recorded in many areas, the reliability of data can be improved.

The lead-in area includes an SBM area, which represents recording-status data, including bit map data about areas where data has been recorded.

A data area includes spare areas 1 and 2, and a user data area. In the embodiment illustrated in FIG. 4, if a user selects to have a defect management performed by a recording and/or reproducing apparatus, the spare area 1 is allocated at the head of the data area, and the spare area 2 is allocated at the rear of the data area.

As described above, the lead-in area, of the write-once recording medium shown in FIG. 4, includes a TDDS area, a TDFL area, and an SBM area storing an SBM. In the data structure of the write-once recording medium of FIG. 4, a finalization flag, according to an embodiment of the present invention, can be recorded in the TDDS area.

Figure 5:
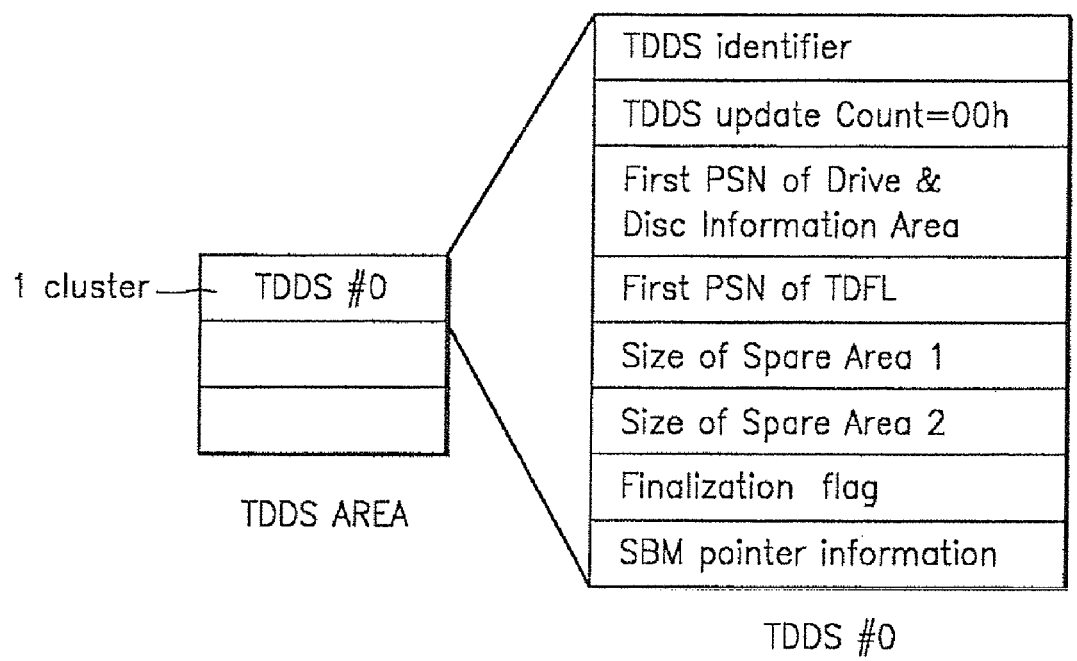
FIG. 5 illustrates a detailed structure of a temporary recording medium defect structure (TDDS) area illustrated in FIG. 4, according to another embodiment of the present invention.

FIG. 5 shows the data structure of the TDDS area shown in FIG. 4. As illustrated in FIG. 5, the TDDS area is made up of a plurality of clusters. A cluster is a data recording unit and is made up of a predetermined number of sectors. One cluster stores one TDDS #k (k is an integer equal to or greater than 0). A sector is the basic physical unit of a write-once recording medium.

As illustrated in FIG. 5, a TDDS #k includes a TDDS identifier, a counter representing the number of TDDS updates, the number of the first physical sector of a drive & write-once disc information area, the number of the first physical sector in which a possible TDFL corresponding to the TDDS #k has been recorded, the sizes of spare areas 1 and 2, a finalization flag, and data regarding an SBM pointer which points to the location of the SBM corresponding to the case of a finalized recording medium.

Meanwhile, if a user does not want defect management performed by the recording and/or reproducing apparatus, then accordingly, no spare areas are allocated, and the sizes of spare areas 1 and 2 are recorded as "0".

FIG. 6 illustrates another embodiment of a data structure of a write-once recording medium having a single recording layer. As illustrated in FIG. 6, the lead-in area includes a TDFL area and an area for both a TDDS and an SBM (i.e., a TDDS+SBM area). The lead-in area of the write-once recording medium illustrated in FIG. 4 stores a TDFL, a TDDS, and an SBM in different areas, while the lead-in area of the write-once recording medium of FIG. 6 stores a TDDS and an SBM in one cluster of a single area. The TDDS+SBM area and the TDFL area make up the TDMA.

Figure 7:
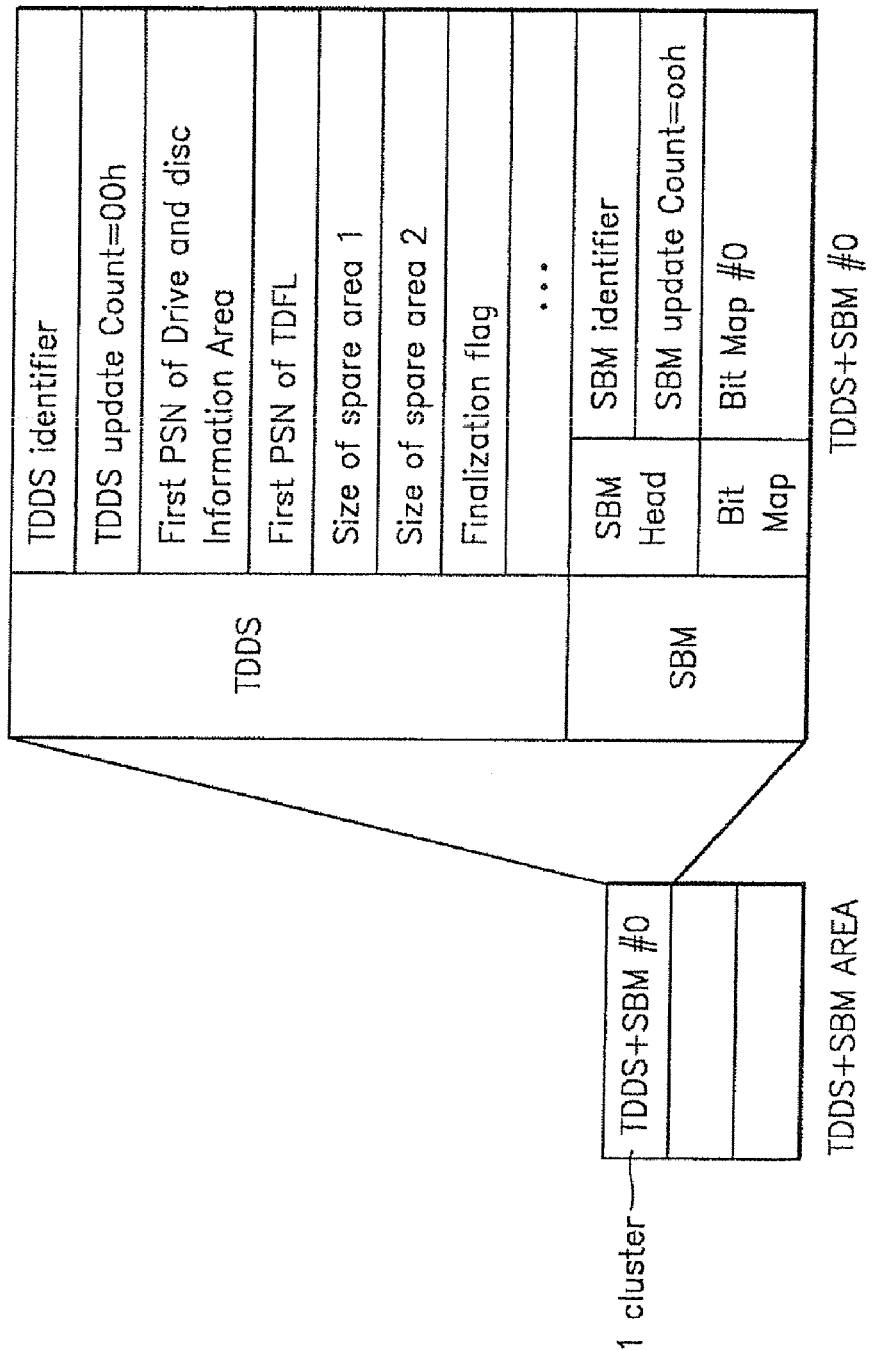
FIG. 7 illustrates a detailed structure of an area of FIG. 6 for storing both a TDDS and a space bit map (SBM), according to an embodiment of the present invention.

FIG. 7 illustrates a detailed structure of the TDDS+SBM area of FIG. 6. A TDDS and an SBM are recorded in one cluster. The TDDS includes a finalization flag, and the SBM includes a bit map corresponding to the finalization flag.

As described above, the finalization flag can be recorded not only in the head area of an SBM #i, but also in various areas such as the TDDS area and the TDDS+SBM area.

An SBM area is preferably formed in at least one of the data area, the lead-in area, and the lead-out area, illustrated in FIG. 1. The SBM area is for storing each SBM #i, each of which represents recording-status data.

As detailed in the above embodiments, an extra finalization flag is used to preserve the data-recording status of a write-once recording medium. Hereinafter, a method of preserving the data-recording status of a write-once recording medium, without using a finalization flag, will be described with reference to FIGS. 8 and 9.

FIG. 8 illustrates another embodiment of a data structure of a write-once recording medium having a single recording layer. As illustrated in FIG. 8, the lead-in area of a write-once recording medium includes a TDMA for storing a TDFL, a TDDS, and an SBM. The lead-in area also includes DMA1 and DMA2 for storing defect management data. The lead-out area of the write-once recording medium includes DMA3 and DMA4.

A TDDS and an SBM are recorded in one cluster of the TDMA, and a TDFL is recorded in another cluster. Although a data structure in which both a TDDS and an SBM are recorded in one cluster is similar to that illustrated in FIG. 7, no finalization flags are recorded.

When the write-once recording medium of FIG. 8 is finalized, a TDDS, an SBM, and a TDFL, which have recently been recorded in the TDMA, are copied and recorded in the DMAs. Because the final SBM, as well as the final TDDS and the final TDFL, is copied and recorded in the DMAs, no finalization flags need to be recorded to represent the final SBM recorded in the TDMA.

An unoccupied area of the TDMA is entirely filled with predetermined data, for example, "ffh", to prevent further data recording on the write-once recording medium. Even when a recording and/or reproducing apparatus receives a command for additional data recording, after finalizing the write-once recording medium, the recording and/or reproducing apparatus does not perform data recording if the TDMA is filled with data such as "ffh" or the DMAs store defect management data.

Figure 9:
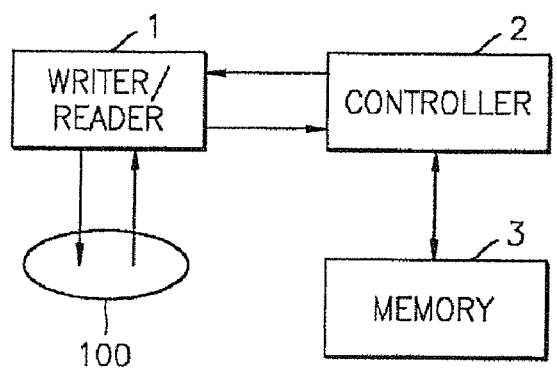
FIG. 9 is a block diagram of an apparatus for achieving preservation of the data-recording status of a write-once recording medium, according to an embodiment of the present invention.

FIG. 9 is a block diagram of an apparatus for achieving preservation of a data-recording status of a write-once recording medium, according to embodiments of the present invention. As illustrated in FIG. 9, the apparatus includes a writer/reader 1, a controller 2, and a memory 3.

The writer/reader 1 writes data to a write-once recording medium 100, under the control of the controller 2, and reads the written data to verify the same.

Upon data recording on the write-once recording medium 100, the controller 2 performs defect management by using a TDMA included in the write-once recording medium 100 and also preserves the data-recording status of the write-once recording medium 100, according to embodiments of the present invention.

Preservation of the data-recording status of the write-once recording medium 100 can be achieved in two ways, namely, the above-described method using a finalization flag and the above-described method without using a finalization flag.

In the method using a finalization flag, the controller 2 produces a finalization flag and records the same in a predetermined area of the write-once recording medium 100, upon finalization of the write-once recording medium 100. To be more specific, with reference to FIG. 3, among the data of the recently updated SBM #n, only the value of a finalization flag is changed from "0" to "1", and the SBM #n having the finalization flag "1" is re-recorded on the area next to the location of the original SBM#n having the finalization flag "0". The controller 2 may control the writer/reader 1 so that the empty area following the SBM #n, having the finalization flag "1", is filled with predetermined data, namely, "ffh". The controller 2 then controls the final recording of the TDDS and the TDFL so that they are copied and recorded in a DMA. The finally recorded SBM does not need to be copied and recorded in the DMA, and the SBM having the finalization flag "1", among SBMs recorded in a TDMA, is used as the finally recorded SBM.

In the method without using a finalization flag, when the controller 2 receives a command from a host (not shown) to finalize the write-once recording medium 100, the controller 2 controls the finally recorded TDDS, the finally recorded SBM, and the finally recorded TDFL so that they are copied and recorded in a DMA. Thereafter, the controller 2 controls the writer/reader 1 so that the entire unoccupied area of the TDMA is filled with predetermined data, for example, "ffh".

Even when the controller 2 receives a command for additional data recording from the host, after finalizing the write-once recording medium 100, it does not perform data recording if the TDMA is filled with data such as "ffh" or if the DMA contains defect management data.

The controller 2 follows a verifying-after-writing method, in which after data is recorded in predetermined units, the recorded data is verified to find defective data. Accordingly, the controller 2 records user data in predetermined units and verifies the recorded user data to identify defective data. The controller 2 produces a TDFL and a TDDS, which indicate the area where the defective data found during verification is stored. The controller 2 stores the TDFL and the TDDS in the memory 3, collects a predetermined amount of TDFL and TDDS, and transfers the collected TDFL and TDDS to the TDMA included in the write-once recording medium 100.

While not required, it is understood that the controller 2 can be a computer implementing the method using a computer readable code encoded on a computer readable medium, or present in any other medium supporting the same, e.g., an optical disc, a wave guide, a carrier wave or channel, etc. The computer can also be implemented as a chip having firmware, or can be a general or special purpose computer programmable to perform the method.

In addition, it is understood that, in order to achieve a recording capacity of several dozen gigabytes, the writer/reader 1 could include a low wavelength, high numerical aperture type unit usable to record dozens of gigabytes of data on the write-once recording medium.

Examples of such units include, but are not limited to, units using light wavelengths of 405 nm and having numerical apertures of 0.85, units compatible with Blu-ray discs, and/or units compatible with Advanced Optical Discs (AOD). Examples of other write-once recording media include CD-R and DVD-R.

Figure 10:
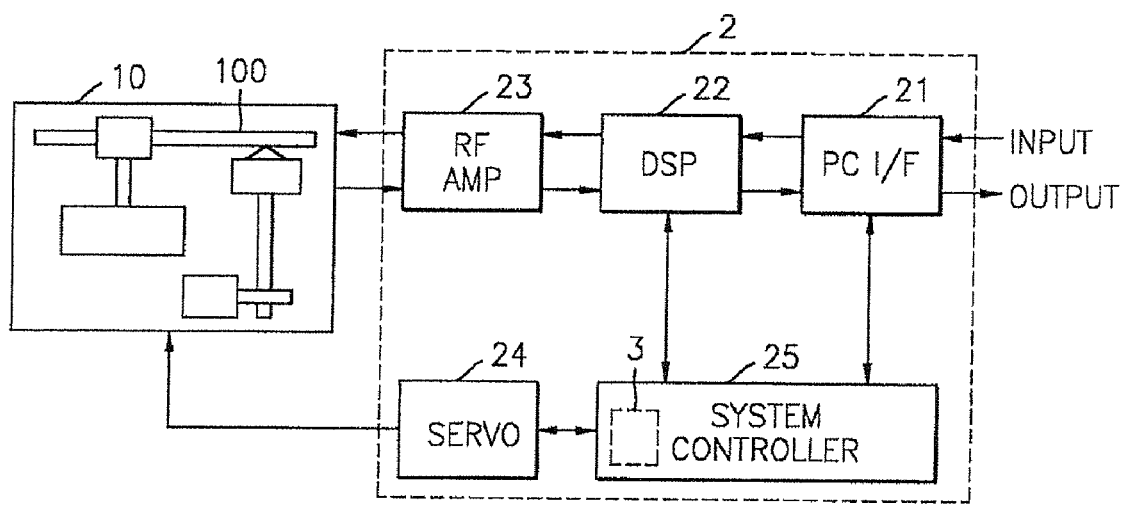
FIG. 10 is a block diagram of a recording and/or reproducing apparatus of FIG. 9.

FIG. 10 is another block diagram of a recording and/or reproducing apparatus. As illustrated in FIG. 10, the recording and/or reproducing apparatus includes a pickup 10 to serve as the writer/reader 1. The write-once recording medium 100 is installed on the pickup 10. The recording and/or reproducing apparatus includes a PC I/F 22, a DSP 22, an RF AMP 23, a servo 24, and a system controller 25, all of which make up the controller 2. The memory 3 can be installed in the system controller 25 of the controller 2.

Upon recording, the PC I/F 21 receives a recording command together with data to be recorded, from a host (not shown). The system controller 25 performs initialization necessary for recording. The DSP 22 performs ECC encoding on the data received from the PC I/F 21 by adding data, such as parity to the received data, and then modulates the ECC-encoded data in a predetermined manner. The RF AMP 23 converts the data received from the DSP 22 into an RF signal The pickup 10 records the RF signal received from the RF AMP 23 to the write-once recording medium 100. The servo 24 receives a command necessary for servo control from the system controller 25 and servo-controls the pickup 10. The system controller 25 commands the pickup 10 to read data from the write-once recording medium 100 or to record predetermined data, such as temporary management data, on the write-once recording medium 100 in order to perform defect management, according to embodiments of the present invention.

Also, when the write-once recording medium 100 is finalized, in response to a user's command, or when the write-once recording medium 100 is finalized because a predetermined finalization condition is satisfied, the system controller 25 commands the pickup 10 to record temporary management data (i.e., a TDDS, a TDFL, and an SBM), finally recorded in the TDMA, to a DMA.

Upon reproduction, the PC I/F 21 receives a reproduction command from the host (not shown). The system controller 25 performs initialization necessary for reproduction. The pickup 10 projects a laser beam onto the write-once recording medium 100, receives a laser beam reflected by the write-once recording medium 100, and outputs an optical signal. The RF AMP 23 converts the optical signal received from the pickup 10 into an RF signal, supplies modulated data obtained from the RF signal to the DSP 22, and supplies a servo control signal obtained from the RF signal to the servo 24. The DSP 22 demodulates the modulated data and outputs data obtained through ECC error correction. The servo 24 receives the servo control signal from the RF AMP 23 and a command necessary for servo control from the system controller 25 and servo-controls the pickup 10. The PC I/F 21 sends data received from the DSP 22 to the host (not shown). Upon reproduction, the system controller 25 can command the pickup 10 to read out information necessary for defect management. In other words, the system controller 25 can manage the entire system during data recording/reproduction.

A method of preserving the data-recording status of a write-once recording medium, according to embodiments of the present invention, will now be described on the basis of the structure of the recording and/or reproducing apparatus of FIG. 10.

Figure 11:
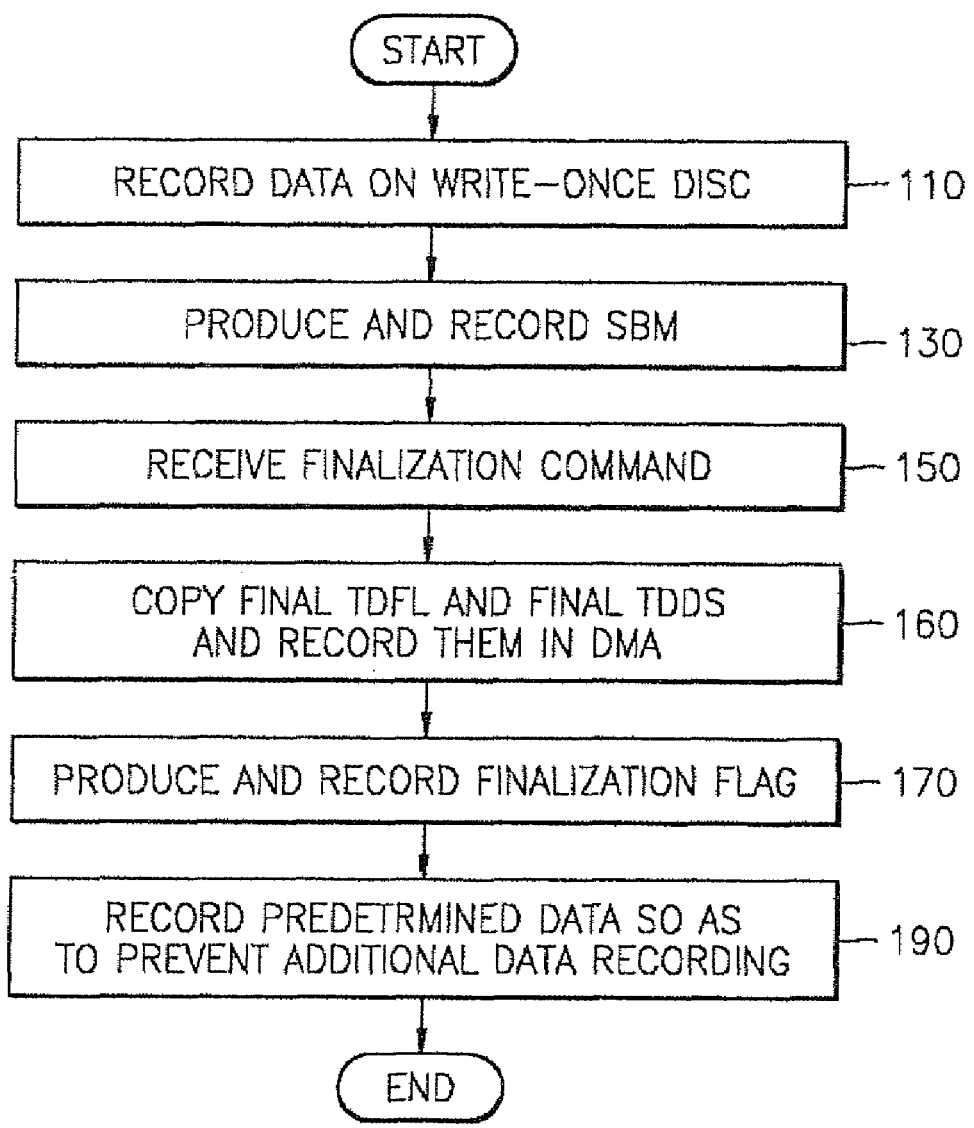
FIG. 11 is a flowchart illustrating a method of preserving the data-recording status of a write-once recording medium, according to an embodiment of the present invention.

FIG. 11 is a flowchart for illustrating a method of preserving the data recording status of a write-once recording medium, according to an embodiment of the present invention. In the method of FIG. 11, preservation of the data recording status of a write-once recording medium is achieved using a finalization flag.

First, in operation 110, the write-once recording medium is inserted into a recording and/or reproducing apparatus for data recording, and data is recorded on the write-once recording medium. When the write-once recording medium is inserted into the recording and/or reproducing apparatus, the write-once recording medium is initialized. Through initialization, the recording and/or reproducing apparatus prepares for data recording by recognizing the inserted write-once recording medium and ascertaining recording power data, defect management data, and other data regarding the write-once recording medium. During initialization, the recording and/or reproducing apparatus accesses an area containing SBMs to obtain information about whether the recordable area of a write-once recording medium contains recorded data, so that the recording power data, the defect management data, and the other data about the write-once recording medium are found quickly. The recording and/or reproducing apparatus obtains preparatory data for data recording during initialisation and transmits the preparatory data to a host connected to the recording and/or reproducing apparatus. Thereafter, the recording and/or reproducing apparatus records data on the write-once recording medium in response to a recording command received from the host.

Data recording on the write-once recording medium not only involves recording user data in the data area but also recording data, necessary for temporary defect management with respect to defects generated in the recorded data, in a TDMA.

In operation 130, when the data-recording status of the write-once recording medium changes due to new data recording, an SBM #i including new bit map data that represents the area containing the new data is produced and recorded in a TDMA. When the new SBM #i is produced and recorded, an update counter representing the number of updates of data about the data-recording status increases by 1.

The time at which an SBM #i is to be produced and recorded may vary according to the program installed in each recording and/or reproducing apparatus. After a write-once recording medium is inserted into a recording and/or reproducing apparatus, and data is recorded on the write-once recording medium, an SBM with a new bit map may be produced and recorded only one time before the write-once recording medium is ejected from the recording and/or reproducing apparatus. However, in the case where an SBM is produced only one time, if an emergency, such as an electricity failure, occurs during recording of data in the write-once recording medium, SBM recording cannot be fully achieved. Hence, it is preferable that an SBM with new bit map data is produced and recorded during data recording on the write-once recording medium.

In operation 150, the recording and/or reproducing apparatus receives a finalization command from the host to finalize the write-once recording medium. Although the finalization command can be arbitrarily issued by a user, the finalization command is typically issued when a predetermined finalization condition is satisfied, for example, when the data area or TDMA is completely filled with data and, accordingly, no more data can be recorded. When the predetermined finalization condition is satisfied, the recording and/or reproducing apparatus may automatically finalize the write-once recording medium without receiving the finalization command from the host. However, preferably, the recording and/or reproducing apparatus informs the host that the predetermined finalization condition has been satisfied, and the host inquires of the user about whether to finalize the write-once recording medium.

Write-once recording media may contain a TDMA to properly manage defects. However, re-writable recording media contain only DMAs, without TDMAs. Hence, a compatibility problem may occur when a re-writable recording and/or reproducing apparatus tries to record or reproduce data on a write-once recording medium. To solve the compatibility problem, a TDDS and a TDFL that have been finally recorded in the TDMA, upon finalization of the write-once recording medium, are copied and recorded in a DMA, in operation 160.

In operation 170, in response to the finalization command, the recording and/or reproducing apparatus produces a finalization flag and records the same in a predetermined area. To be more specific, the value of a finalization flag, among data in a final update of SBM #n, is changed from 0 to 1 while a bit map #n representing an occupied area is maintained. An SBM #n including the finalization flag "1" is re-recorded in the location next to the location of the final update of SBM #n.

Although a finalization flag is recorded in the head area of an SBM #i in the above-described embodiments, the location is not limited in the embodiments of the present invention. As described above, a finalization flag may be recorded in an area other than the head area of the SBM #i.

In operation 190, to prevent additional data recording, predetermined data is recorded in an area next to the area of the SBM #n with the finalization flag "1". For example, "ffh" is recorded to prevent further SBM recording and prevent additional data from being recorded on the write-once recording medium.

FIG. 12 is a flowchart for illustrating a method of preserving the data recording status of a write-once recording medium, according to another embodiment of the present invention. In the method of FIG. 12, preservation of the data recording status of a write-once recording medium is achieved without using a finalization flag.

First, in operation 310, the write-once recording medium is inserted into a recording and/or reproducing apparatus for data recording, and data is recorded on the write-once recording medium.

In operation 330, when the data-recording status of the write-once recording medium changes due to new data recording, an SBM #i including new bit map data that represents the area containing the new data is produced and recorded in a TDMA.

In operation 350, the recording and/or reproducing apparatus receives a finalization command from the host to finalize the write-once recording medium.

In operation 370, a TDDS and a TDFL that have been finally recorded in the TDMA are copied and recorded in a DMA.

In operation 390, to prevent additional data recording, predetermined data is recorded in the TDMA. For example, the unoccupied area of the TDMA is filled with "ffh" to prevent additional data from being recorded on the write-once recording medium.

Because the final SBM, as well as the final TDDS and the final TDFL, is copied and recorded in the DMA upon finalization, no finalization flags need to be recorded to represent the final SBM recorded in the TDMA. Even when the recording and/or reproducing apparatus receives a command for additional data recording from the host after finalizing the write-once recording medium, it does not perform data recording if the TDMA is filled with data such as "ffh" or if the DMA contains defect management data.

While described in terms of a write-once recording medium, it is understood that the method can be used with rewritable media or where the medium has write-once and rewritable portions.

As described above, according to the present invention, in a write-once recording medium capable of preserving a data recording status of the recording medium, a method of preserving the data recording status of the write-once recording medium, and a recording and/or reproducing apparatus for preserving the data recording status of the write-once recording medium, the data recording status of a finalized write-once recording medium is preserved or modification of the data recording status of the finalized recording medium is prevented. A change in the data recording status of the finalized recording medium is easily ascertained. Also, the original data recorded in the write-once recording medium, corresponding to the previous recording status, can be ascertained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of preserving a data recording status of a recording medium, comprising:
    recording data on the recording medium;
    recording temporary disc management information in a temporary defect management area of the recording medium;
    receiving a command to finalize the recording medium;
    recording the temporary disc management information in a defect management area of the recording medium; and
    recording meaningless data in an unoccupied area of the temporary defect management area, wherein the recording medium is a write-once recording medium.

2. The method of claim 1, wherein the temporary disc management information is a combination of a temporary disc definition structure, a temporary defect list and a space bit map.

3. A method for reproducing user data from a recording medium comprising a defect management area and temporary management area, the method comprising:
    reproducing disc management information from the defect management area; and
    reproducing the user data using the disc management information,
    wherein the disc management information is one which is recorded when the recording medium is finalized, the disc management information being a copy of temporary disc management information in the temporary defect management area; and
    wherein the temporary defect management area comprises meaningless data which is recorded in an unoccupied area of the temporary defect management area when the recording medium is finalized.

4. The method of claim 3, wherein the temporary disc management information is a combination of a temporary disc definition structure, a temporary defect list and a space bit map.

5. An information recording medium which is reproduced by a reproducing apparatus, the information recording medium comprising:
    a temporary defect management area comprising temporary disc management information;
    a defect management area comprising disc management information which is recorded when the information recording medium is finalized, the disc management information being a copy of the temporary disc management information in the temporary defect management area; and
    an user data are comprising data,
    wherein the temporary defect management area comprises meaningless data which is recorded in an unoccupied area of the temporary defect management area when the information recording medium is finalized.

6. The method of claim 5, wherein the temporary disc management information is a combination of a temporary disc definition structure, a temporary defect list and a space bit map.

* * * * *